May 16, 1967 J. H. RISEMAN ETAL 3,320,486

ELECTRONIC INSTRUMENT

Filed Sept. 15, 1964 2 Sheets-Sheet 1

INVENTOR.
JOHN H. RISEMAN
CHARLES M. DOLE, JR.
THEODORE VOUTSELAS
BY Robert J. Schiller
ATTORNEY May 16, 1967 J. H. RISEMAN ETAL 3,320,486

ELECTRONIC INSTRUMENT

Filed Sept. 15, 1964 2 Sheets-Sheet 2

INVENTOR.
JOHN H. RISEMAN
CHARLES M. DOLE, JR.
THEODORE VOUTSELAS

BY Robert J. Schiller
ATTORNEY

United States Patent Office 3,320,486
Patented May 16, 1967

3,320,486
ELECTRONIC INSTRUMENT

John H. Riseman, Cambridge, Mass., Charles M. Dole, Jr., New York, N.Y., and Theodore Voutselas, Holliston, Mass., assignors to Corning Glass Works, Corning, N.Y., a corporation of New York Filed Sept. 15, 1964, Ser. No. 396,559
10 Claims. (Cl. 317—101)

This invention relates to electronic instruments and more particularly to the art of housing electronic instruments.

The primary object of the present invention is to provide a new and improved form of cabinet construction which constitutes a material improvement over structures used heretofore to house electronic instruments. Instrument cabinets of the prior art typically involve a rectangular box-shaped design with vertical front and back panels. In many cases they consist of unitary box-shaped structures with one or more open sides which are fitted with removable panels to permit access to the instruments per se. In other cases, the box-like housings utilize the breakaway principle, consisting of a plurality of stamped members which interlock or are secured to each other by auxiliary fasteners. While such prior art instrument cabinets have achieved wide use, it has been recognized that often they are not wholly satisfactory from the standpoint of taking good advantage of printed circuit board design, or accommodating dials, controls, connectors, etc., in positions which render them easy to read and use. Other faults of prior art cabinet designs include difficulty of assembly and disassembly, excessive cost or size, or poor exterior appearance occasioned by slavish loyalty to conventional cabinet design concepts.

Accordingly, a specific object of this invention is to provide a new instrument cabinet construction which constitutes an improvement over the prior art by overcoming most, if not all, of the foregoing limitations.

Still another specific object of this invention is to provide an improvement in the art of housing electronic instruments using printed circuit board construction.

Figure 1:
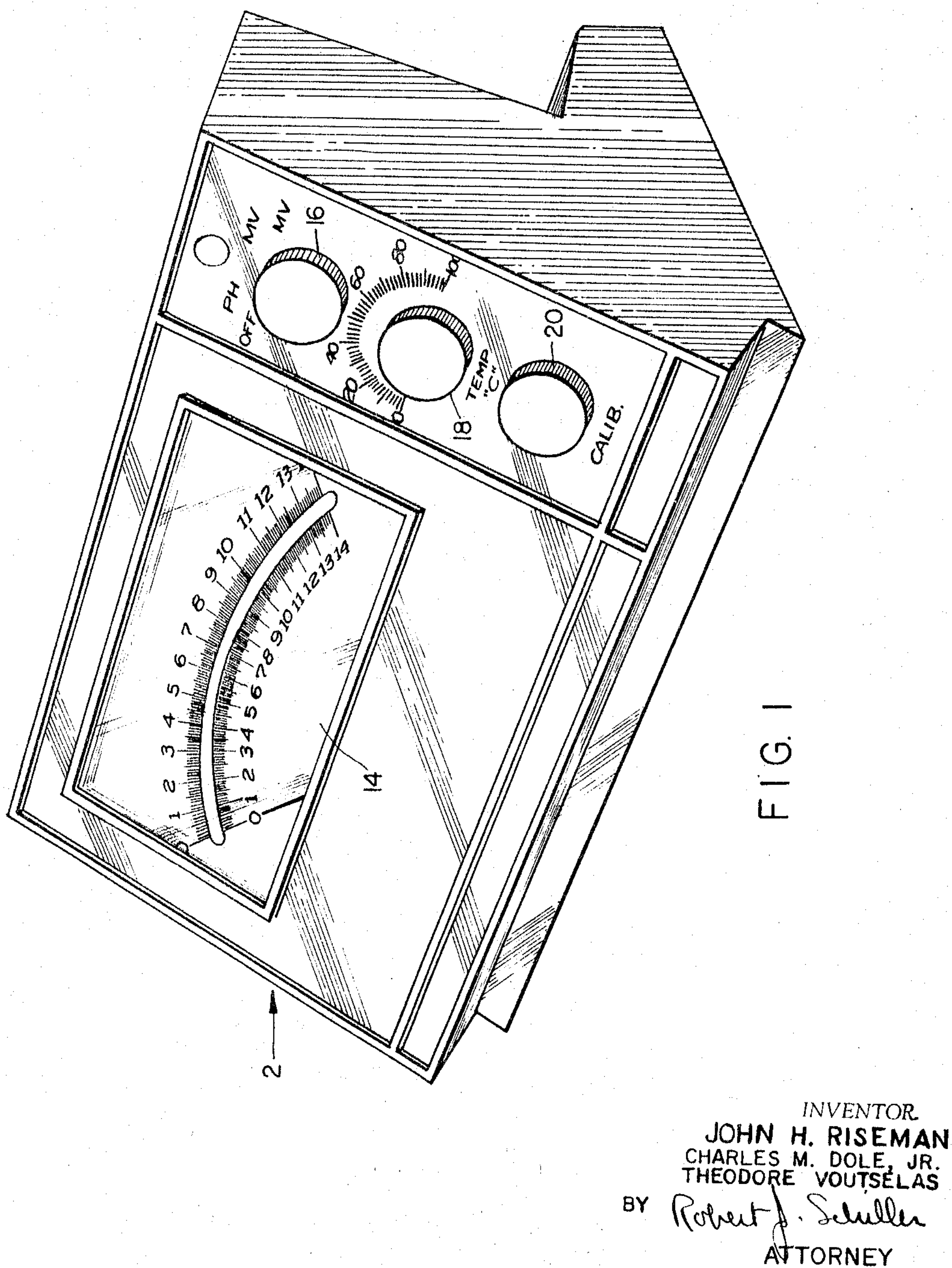
Figure 2:
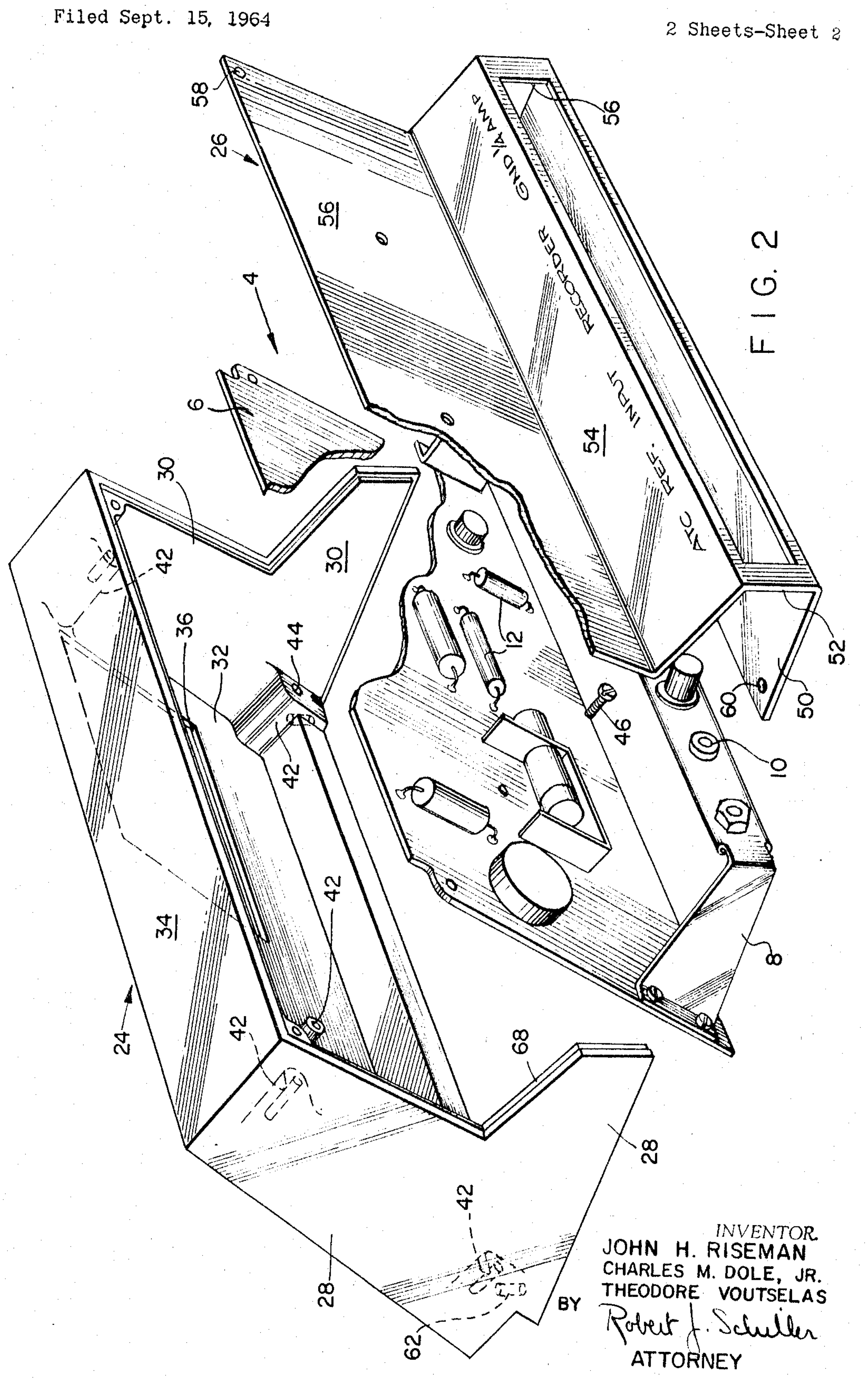

Other objects and many of the attendant advantages of the present invention will become more readily apparent from the following detailed specification when considered together with the accompanying drawings, wherein:

FIG. 1 is a front perspective view of electronic apparatus embodying the present invention; and FIG. 2 is a rear exploded view of the same instrument.

The illustrated embodiment of the invention is an electronic pH meter. However, the present invention is applicable to a wide variety of electronic instrument. Accordingly it is to be understood that this illustrated embodiment is presented merely by way of example and not by way of limitation. Furthermore, because the function and mode of operation of the pH meter are not determinative of the invention, details of the instrument are omitted except to the extent deemed essential for a complete, clear, and concise description of the invention.

The apparatus shown in the drawings consists of a cabinet 2 of unique construction enclosing a separate and distinct printed circuit board assembly 4 (FIG. 2). The latter comprises a printed circuit board 6 to which is secured a U-shaped bracket 8. The bracket serves two purposes. Its first purpose is to serve as a mount for certain of the instruments' components which are to be accessible to the user. Typically such components are connectors as shown at 10 or switches, potentiometers, etc. The second purpose of bracket 8 is to serve as a stand for the printed circuit board when it is removed from the housing for inspection or repair. The printed circuit board 6 supports all of the other electronic and electrical components of the instrument. In addition to the expected use of resistors, capacitors, transformers, etc., some of which are shown at 12, the printed circuit board supports an indicator 14 and controls provided with knobs 16, 18, and 20 which are front mounted.

The cabinet may be made of any suitable material, e.g. metal or plastic, and consists of two parts—a fore part 24 and a rear part 26. The fore part 24 consists of two side walls 28 and 30, plus a front wall 32 and a top wall 34. The side walls are formed so that their bottom edges form acute angles with the front wall, whereby when the cabinet is positioned on a horizontal surface such as a table or laboratory work bench, the front wall is slanted at an angle which renders the indicator and control knobs easy to read and use. It is to be observed that the top wall of the fore part of the cabinet has a smaller front-to-rear dimension than the bottom edges of the side walls, with the side walls having rearwardly-projecting extensions 28*a* and 30*a* which extend beyond the rear edge of the top wall. The front wall is provided with a rectangular hole 36 to accommodate the indicator plus several additional holes for the stems of the controls to which knobs 16–20 are attached.

Formed integral with front panel 32 of the fore part are five bosses 42 provided with tapped holes 44. These bosses serve to receive screws as shown at 46 used to secure the printed circuit board in place. The bosses extend at right angles to the front wall and their rear faces are in co-planar relation, as a result of which the printed circuit board is positioned parallel to the plane of the front wall. When the printed circuit board is secured to the fore part, the bottom edges of the bracket 8 are disposed in a plane above and substantially parallel to the plane of the bottom edges of the side walls.

The rear part 26 is designed to provide a bottom wall as well as a rear wall for the cabinet. The bottom wall is a planar member as shown at 50. The rear wall is shaped to complement the profile presented by the rear edges of the side walls 28 and 30. It includes a substantially vertical bottom portion 52, a reentrant intermediate portion 54 which slants upwardly and forwardly from bottom portion 52, and a top portion 56 which extends upwardly and slightly rearwardly from intermediate portion 54. The bottom portion 52 is provided with a rectangular aperture 56 to accommodate the rear portion of bracket 8 which supports the connectors 10.

The rear part is releasably secured to the fore part. This is achieved by providing a hole 60 at each of the front corners of the bottom wall to accommodate screws which are received by tapped holes 62 formed in the two bosses 42 located at the bottom corners of the fore part. Preferably the rear edge of the front wall and the rear and bottom edges of the side walls are grooved as shown at 68 to make a neat fit with the corresponding edges of the rear part. When the apparatus of FIG. 2 is assembled together in the manner just described, the reentrant portion 54 of the rear wall covers the bracket 8 and forms a slanted shelf which provides a convenient place to locate indicia for the connectors and other components which are accessible through aperture 56. Typical indicia is shown in FIG. 2. Because the shelf bearing the indicia extends rearwardly of the upper portion of the rear wall, the user of the instrument may read the indicia from a vantage point above and forward or above and behind the rear wall. This is a distinct advantage over conventional constructions where the indicia for rear-mounted connectors, switches, etc., is mounted on a vertical panel in a hard-to-read position.

It is believed to be apparent also that the construction herein described and illustrated involves a minimum of fasteners to hold the parts together and is easy to assemble and disassemble. Moreover, it facilitates use of a printed circuit board assembly supporting all of the circuit components of the electronic instrument. Another advantage is that the cabinet parts are relatively inexpensive and easy to fabricate and can be made of metal or plastic. Still other advantages are that the cabinet is compact, the front panel is at an angle facilitating reading of the indicator and use of the control knobs, and the overall construction lends itself to wide variations in exterior shape, size and design.

It is to be understood that the invention is not limited in its application to the details of construction and arrangement of parts specifically described or illustrated, and that within the scope of the appended claims, it may be practiced otherwise than as specifically described or illustrated.

We claim:

1. Electronic apparatus comprising a printed circuit board assembly supporting the circuit components of said apparatus, said components including a front-facing indicator and at least one rear-facing component, a cabinet enclosing said printed circuit board assembly, said cabinet comprising a fore part and a rear part, said fore part providing a pair of side walls as well as the top and front walls for said cabinet, said front wall sloping upwardly and rearwardly and having an opening for said indicator, said rear part providing a rear wall and a bottom wall for said cabinet, said rear wall having an aperture for access to said rear facing component, means securing said printed circuit board assembly to said fore part in parallel spaced relation to said front wall, and means securing said rear part to said fore part.

2. Electronic apparatus as defined by claim 1 wherein said rear wall is offset above the level of said rear-facing component so as to provide a shelf portion visible from above.

3. Electronic apparatus as defined by claim 1 wherein said rear wall is offset to provide a shelf portion above said rear-facing component, and further wherein said shelf portion is provided with indicia identifying said rear-facing component, said rear wall offset sufficiently for said indicia to be visible from a vantage point above and forward of said shelf portion.

4. In combination with an electronic instrument, a cabinet for housing the components thereof comprising a fore part and a rear part, said fore part providing a pair of side walls, a front wall and a top wall, said side walls shaped so that when said cabinet is disposed on a horizontal support, said front wall is inclined to the vertical, said front wall having openings for certain indicator and control components of said instrument, said rear part providing a rear wall and a bottom wall for said cabinet, said rear wall having an aperture adjacent its bottom edge for access to certain others of said components and comprising a reentrant portion above said aperture with indicia identifying the components accessible through said apreture, said indicia visible from above said cabinet.

5. In electronic apparatus, the combination including a printed circuit board assembly mounted within a cabinet, said assembly comprising a printed circuit board and a member attached thereto for supporting said board on edge when removed from said cabinet, said board supporting a front facing indicator, said member supporting at least one rear-facing electrical component of said apparatus, said cabinet comprising a fore part and a rear part releasably secured together, said fore part providing a front wall for said cabinet, said front wall having an aperture to accommodate said front-facing indicator, means securing said printed circuit board to said fore part with said indicator disposed in said aperture, said rear part providing a rear wall for said cabinet, said rear wall having an aperture permitting access to said rear-facing electrical component.

6. Apparatus as defined by claim 5 wherein said rear wall is provided with indicia for said rear-facing component, said indicia positioned so as to be visible from a vantage point above and forward thereof.

7. Apparatus as defined by claim 5 wherein said front wall and said printed circuit board are slanted upwardly and rearwardly.

8. A cabinet structure for a printed circuit board assembly which includes a forwardly facing indicator and a rearwardly projecting circuit board stand, said structure comprising a fore part and a rear part releasably secured together, said fore part providing a front wall having an aperture sized to accommodate said indicator, said fore part also including receptacles for fasteners to secure said circuit board assembly in substantially parallel relation to said front wall, said rear part providing a rear wall with an offset bottom portion for enclosing said stand.

9. A cabinet structure as defined by claim 8 wherein said rear part also provides a bottom wall for said structure.

10. A cabinet structure as defined by claim 8 wherein said fore part includes side walls with co-planar bottom edges, and further wherein said front wall is disposed at an acute angle to the plane of said bottom edges, whereby when said structure is resting on said bottom edges, said front wall is tilted to facilitate observation of said indicator.

References Cited by the Examiner

UNITED STATES PATENTS

| | | | |
|---|---|---|---|
| D. 198,050 | 4/1964 | Frankel | 325—352 |
| D. 201,360 | 6/1965 | Dole et al. | 26—1 |
| 3,137,815 | 6/1964 | Hershey | 317—101 X |

ROBERT K. SCHAEFER, *Primary Examiner.*

W. C. GARVERT, *Assistant Examiner.*